United States Patent Office 3,554,628
Patented Jan. 12, 1971

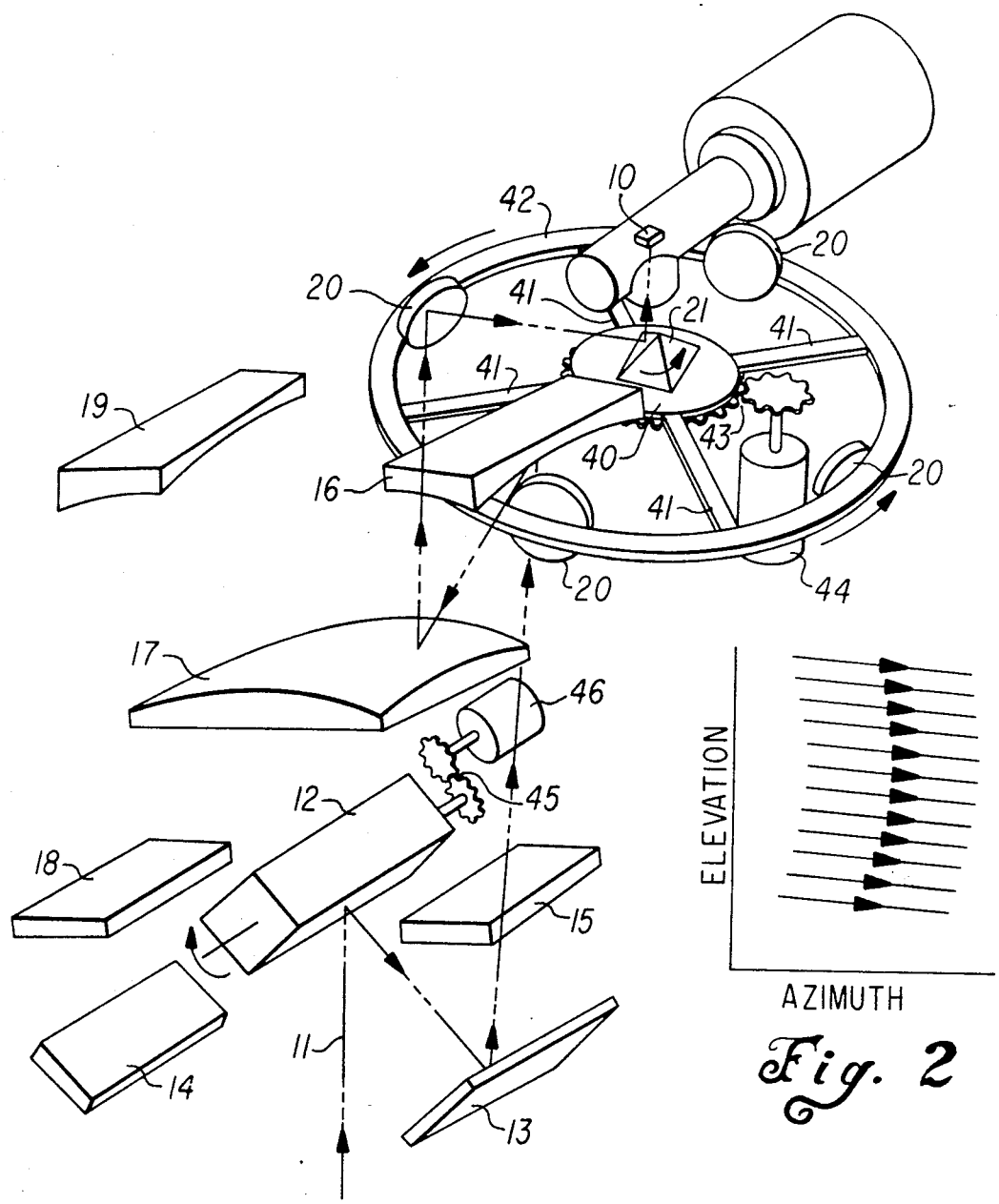

3,554,628
INFRARED OPTICAL SYSTEM UTILIZING CIRCULAR SCANNING
Howard V. Kennedy, Dallas, Tex., assignor to Texas Instruments Incorporated, Dallas, Tex., a corporation of Delaware
Filed May 3, 1966, Ser. No. 548,350
Int. Cl. G02b 13/14
U.S. Cl. 350—1                    9 Claims

ABSTRACT OF THE DISCLOSURE

An optical apparatus is disclosed for use in producing a visual picture of the infrared image of a terrain area, the apparatus utilizing a circular scan of the terrain area in the image plane of the apparatus.

---

This invention relates to an optical system suitable for performing a raster scan of an area to be observed by a forward-looking infrared reconnaissance system, and more particularly to such a system utilizing a circular scan of focused radiation.

In a forward-look infrared reconnaissance system such as the one described in copending application, Infrared Reconnaissance System, Ser. No. 511,022, filed Nov. 26, 1965, by James Crownover, a mechanically driven optical scanning system is used to move an infrared image of the area under observation across an infrared radiation detecting element. In other words, the reconnaissance system scans the ground with an infrared detector. The ground scan pattern may be a raster pattern, permitting the infrared image detected to be readily displayed on a cathode ray tube using the favorable raster scanning pattern. One of the problems encountered in the performance of the mechanical scanning by the optical system is that of obtaining sufficiently high scan rates using mechanical components. One approach to maximizing a raster scan rate is to maximize the scanning efficiency of the system, that is, to maximize the percentage of the time that the elements of the optical system are in a position to perform a useful scan. Another approach is to provide for the use of small-scale scanning optics, which are capable of operating at higher scan rates than larger optics.

Therefore, it is an object of the invention to provide an optical system exhibiting efficient scanning.

It is another object of the invention to provide an optical system with scall-scale scanning optics.

It is a further object of the invention to provide a raster scanning optical system utilizing a circular scan to produce efficient scanning.

It is another object of the invention to provide a raster scanning optical system utilizing a scan in the image plane by small-scale optics.

It is yet another object of the invention to provide a raster scanning optical system utilizing a circular scan in the image plane.

It is a still further object of the invention to provide a raster scanning optical system exhibiting an optical quality and scanning rate suitable for use in a forward-looking infrared reconnaissance system.

In accordance with one aspect of the invention, there is provided an optical system having an element which scans the incident radiation along a first raster dimension and transmits the scanned radiation to focusing elements which converge the radiation and transmit it to optical elements which move in a circular path for scanning the radiation along another raster dimension and redirecting its path to a detector.

Other objects, features and advantages of the invention will be more readily understood from the following detailed description when read in conjunction with the appended claims and attached drawing, in which:

FIG. 1 is a pictorial view of an optical system according to the invention.

FIG. 2 is an illustration of a terrain scan performed by the optical system of the invention.

Figure 3:
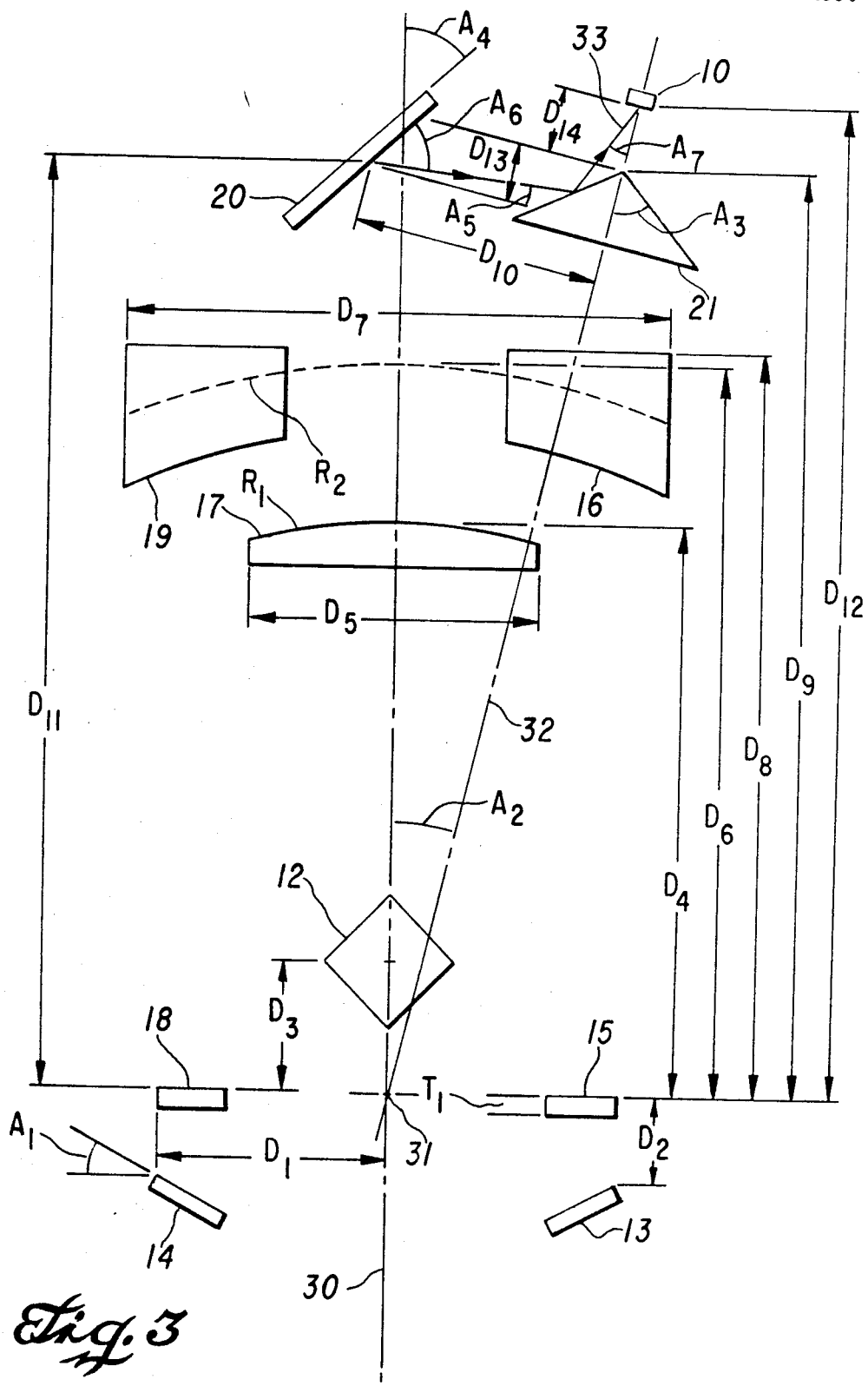
FIG. 3 is a plan view of the optical system of FIG. 1, showing dimensions of the system.

The apparatus shown in FIG. 1 is the optical system of a forward-looking infrared scanner. The function of the total scanner system is to produce a visual picture of the infrared image of a scene, such as the image of a terrain area forward of a reconnaissance aircraft. The optical system of FIG. 1 focuses the infrared radiation from the area under observation onto an infrared detector 10. That is, the focusing elements of the optical system in FIG. 1 create an image surface in which the infrared image of the observed area lies, and in which surface is located infrared radiation detector 10. Detector 10 is equipped with field stops which limit the portion of the image plane from which the detector receives infrared radiation, and hence limit that portion of the observed terrain area from which radiation is being sensed at any given instant. For example, at any instant the detector 10 may detect only that radiation entering the optical system from a solid angle of several microsteradians. Depending on the relationship of the scanner system to the observed terrain area, this may mean that the detector is sensing only the radiation from several square feet of terrain at any given instant. Then, by means of the motion of elements in the optical system, the infrared image is moved about in the image plane containing detector 10, so that the small portion of the area being observed by detector 10 at any given instant will change. This movement of the scanned area is done in a systematic way, so that electronic equipment may be used to process the electrical output of the infrared detector 10 and form a visual display of the infrared image of the observed area.

In particular, it is desirable to perform a raster scan of the observed terrain area. The particular scan to be performed by the system of FIG. 1 is shown in FIG. 2. FIG. 2 may be taken as an illustration of the path on the ground of the small area to which the infrared detector 10 is sensitive at any given instant. The "elevation" dimension corresponds to, say, the direction of the observing aircraft, while "azimuthal" is the dimension on the ground perpendicular to the flight path of the aircraft. The spot to which the detector 10 is sensitive moves in the azimuthal direction from left to right, and then begins another sweep from left to right and so on until, say, sixty-six azimuthal scans have been made in this manner. Then the spot jumps to the beginning of the pattern (in the top left-hand corner of FIG. 2) and begins the pattern again. The whole pattern is traced, for example, at a rate of twenty-four times per second. It is seen that beginning and the end of the individual traces lie on curved paths. The reason for this is explained below in connection with the operational details of the optical system of the invention. The scan lines are shown relatively widely separated only for the purposes of illustration; in practice, they are sufficiently close to form a complete image of the area under observation.

While the optical system makes possible the scanning of the area under observation in the manner illustrated in FIG. 2, the electrical output of the infrared detector 10 is processed by electronic circuitry to create a visual display of the infrared image being sensed. For example, the output of the infrared detector 10 may be used to modulate the cathode ray intensity on a long persistence cathode ray tube in which the cathode ray is made to produce a visual pattern on the face of the tube which is a scaled down version of the scan pattern in FIG. 2. Then the visual image on the face of the cathode ray tube will be a representation of the infrared image of the area observed by the apparatus in FIG. 1.

The operation of the optical system of the invention will now be described broadly with reference to FIG. 1. The infrared rays incident on the optical system from the observed area are represented by incoming ray 11. Azimuth scan mirror 12 is a rotating prism which reflects the incoming rays from the sides thereof to mirrors 13 and 14. Mirror 12 can be rotated by any suitable means. The rotating means for said mirror illustrated in FIG. 1 is a gear system 45 operated by a motor 46. The ray incident on mirror 13 is shown in FIG. 1. It is apparent that either the system of FIG. 1 may be oriented to receive rays 11 from the particular area of interest, or additional flat mirrors may be used in conjunction therewith to gather the radiation from the area of interest and direct it on azimuth scan mirror 12. The rays reflected from the surface of, for example, mirror 13 pass through corrector plate 15 and are then reflected from concave spherical mirror 16 and convex spherical mirror 17. Rays from mirror 14 pass through corrector plate 18 and are reflected from mirror 19 onto mirror 17. Corrector plate 15, mirror 16 and mirror 17 form a focusing optical system to focus the radiation reflected from mirror 13 in an image surface. Corrector plate 18, mirror 19 and mirror 17 form a similar system for the radiation from mirror 14. Elevation scan mirrors 20 are four plane mirrors which rotate together in a circle as indicated by arrows in FIG. 1. Rotating with mirrors 20 is a pyramidal mirror 21 which directs the radiation reflected from one of the mirrors 20 to detector 10. The mirrors 20 and the pyramidal mirror 21 can be rotated by any suitable means. The rotating means illustrated in FIG. 1 are a small platform 40 supporting pyramidal mirror 21 with connecting members 41 securing circular member 42 on which mirrors 20 are mounted. Said means are rotated by a gear system 43 operated by a motor 44.

As mirror 12 rotates, one of the reflecting sides thereof is facing the terrain to be observed causing a sweep across the terrain in an azimuthal direction. The rotation of mirror 12 causes the image cast upon the image surface in which detector 10 lies to move across detector 10, so that the area to which detector 10 responds is a scan of the observed terrain in an azimuthal direction. At the same time that mirror 12 is causing detector 10 to scan the terrain in an azimuthal direction, one of mirrors 20 moves in a circular path across the rays focused by mirror 17. As a result, mirror 20 moves across infrared rays corresponding to different terrain locations in the elevation dimension and thereby moves the image in the image plane across detector 10 in the elevation dimension. Thus, the area of the terrain to which detector 10 is sensitive moves in the elevation dimension as desired. The composite elevation and azimuthal scan is that shown in FIG. 2.

With reference to FIG. 3, the operation and construction of the optical system of the invention will be described in detail. Mirror 12 is a prism in the shape of a rectangular solid. As shown in FIG. 1, the long sides of the prism are oriented to receive the radiation from the area under observation. In FIG. 3, the prism is viewed parallel with its long axis of symmetry about which it is rotated by a conventional motor (not shown). In FIG. 3, the radiation incident upon azimuth scan mirror 12 comes from many angles, but the field of view of the mirror is symmetrical about the center line 30. As the mirror 12 turns, the radiation reflected therefrom tends to fall most of the time more on either mirror 13 or mirror 14. The rest of the system is arranged so that this tendency is accentuated, and the radiation sensed by detector 10 at any given instant comes either from mirror 13 or mirror 14, but not from both. Hence, as mirror 12 rotates, the image conveyed to detector 10 comes alternately from mirror 13 and then from mirror 14. However, so far as the effect produced at detector 10 is concerned, the scan produced by mirror 14 is just the same as that produced by mirror 13; therefore, there are twice as many scans of the terrain per revolution of mirror 12 than there would be if one of mirrors 13 and 14 were eliminated.

As previously mentioned, corrector plates 15 and 18, mirrors 16 and 19 and mirror 17 form a focusing system. The mirrors 16 and 17 focus at an image point radiation from a given terrain point which has been reflected from mirrors 12 and 13, while mirrors 19 and 17 focus the radiation from the same terrain point which has been reflected from mirrors 12 and 14 at the same image point. Corrector plates 15 and 18 are for the purpose of correcting spherical aberration which results from the use of the spherical mirrors 16, 19 and 17 to converge the radiation. The objects which the system of the invention are normally used to observe may be considered for optical purposes to be located an infinite distance from the optical system. The collection of image points or focal points produced by mirrors 16, 19 and 17 which correspond to such infinitely distant object points is a portion of a sphere having its center at point 31 of FIG. 3. For the system of the particular dimensions listed below the radius of the sphere is 19.68 inches. However, one of the mirrors 20 intercepts the focused radiation from mirror 17 and directs it to mirror 21.

The mirrors 20 are plane mirrors which rotate about center line 32. The mirror 21 is in the shape of a regular pyramid having four triangular reflecting sides and a square base, each side directed to receive radiation from one of the mirrors 20 and therefore likewise rotating with the mirrors 20 about center line 32. Only one of the mirrors 20 is shown in FIG. 3. The combination of mirrors 20 and 21 reflect the radiation from mirror 17 to a focal point at detector 10. A ray path is shown in FIG. 3 as path 33. The radiation at detector 10 is focused because the distance it travels after striking the surface of mirror 20 is the same as the distance from that point on mirror 20 to the spherical image surface earlier described. The fact that the image surface is a sphere and the scan path of mirror 20 is a circle makes it possible to arrange mirrors 20 and 21 and detector 10 so that the distance traveled by the radiation from the surface of mirror 20 to detector 10 is the same throughout the arc that mirror 20 makes as it rotates. Hence, there is avoided the loss of resolution which would result from moving detector 10 from the focal point. As seen in FIG. 3, the center of the circle of rotation of mirrors 20 is on the radius of the spherically shaped image surface of the focusing optics.

Because of the circular path of mirrors 20, the ground scan performed by the system of FIGS. 1 and 3 is that of FIG. 2, exhibiting a curvature in the displacement of the azimuth scans. As previously mentioned, if the scan lines are displayed on, for example, a cathode ray tube in the same relationship as the lines are scanned on the ground, there will be no distortion of the image presented by the cathode ray tube.

Values of the dimensions shown in FIG. 3 are given below for a typical system according to the invention.

| | In. |
|---|---|
| $D_1$ | 3.700 |
| $D_2$ | 1.500 |
| $D_3$ | 2.087 |
| $D_4$ | 9.070 |
| $D_5$ | 4.700 |
| $D_6$ | 11.600 |
| $D_7$ | 8.80 |
| $D_8$ | 11.943 |
| $D_9$ | 14.546 |
| $D_{10}$ | 4.046 |
| $D_{11}$ | 14.680 |
| $D_{12}$ | 15.516 |
| $D_{13}$ | 0.897 |
| $D_{14}$ | 1.000 |
| $A_1$ | 22.5° |
| $A_2$ | 14°15' |
| $A_3$ | 56° |
| $A_4$ | 48°15' |
| $A_5$ | 6° |
| $A_6$ | 56° |
| $A_7$ | 28° |

| | In. |
|---|---|
| $T_1$ | 0.25 |
| $R_1$ | 9.070 |
| $R_2$ | 11.600 |

In the above system, the surfaces of the corrector plates 15 and 18 are described by the equation (dimensions in inches).

$$y = -(1.1 \times 10^{-3} r^2) + (3.7 \times 10^{-5} r^4) + (2.0 \times 10^{-7} r^6)$$

The y axis is center line 30, with y having the value zero at point 31. The positive values of y are toward the top of FIG. 3. The term r is a radial dimension perpendicular to center line 30 and having the value zero at center line 30.

Mirrors 13, 14, 16, 17, 19 and 20 and pyramid 21 may be made of 7740 Fine Annealed Pyrex glass with reflecting surfaces of aluminum deposited thereon. The prism mirror 12 may be fashioned of 2024T6 aluminum. The corrector plates 15 and 18 are of Irtran-4 manufactured by the Eastman Kodak Company.

The rotation of the mirror 12 above may be, for example 200 revolutions per second. That of the set of mirrors 20 may be 360 r.p.m.

The mirrors 16 and 19 are 9.62 inches long in the dimension perpendicular to the page in FIG. 3. Mirror 17 is 6.32 inches long in the same dimension.

A suitable infrared sensor for use as detector 10 is mercury-doped germanium. Its 8-14 micron response is optimum for detection of objects against a terrestrial background.

One of the advantageous features of the invention is that one of the scans is performed in the "image plane." That is, the scan is performed in the portion of the system where the rays are focused. In the optical system illustrated, it is the elevation scan which is performed in the image plane. An advantage of such an arrangement is that the operation on focused rays makes possible the use of smaller scanning optics. The smaller scanning optics are desirable because they can generally be operated at higher scanning rates than a large system, which among other things will have a larger mass to be moved. Also the smaller optics occupy less space.

Another advantage is the large scanning efficiency—about 45%—which is possible using the optical system of the invention. That is to say that 45% of the time, the optical system of the invention is performing a useful scan. Most of this relatively large potential scan efficiency derives from the use of the circular scan of mirrors 20. The scanning efficiency of the prism mirror 12 by itself is about 50%, whereas that of the circular scan mirrors 20 by themselves is about 90%, yielding a total scan efficiency of about 45%. The reason for the difference in efficiency lies in the type of mirror arrangements which may be used to perform the two types of scan. A circular scan is one in which the scanning portion of the mirror moves across the scanned rays to produce a circular image path. In a line scan the image path is straight. The circular scan path makes possible an arrangement of mirrors such as that of mirrors 20 in which the mirrors follow one another across the rays to be scanned. The line scan is conveniently performed by a rotating mirror such as mirror 12. If a limited field is to be scanned, part of the scanning period for each face on mirror 12 is wasted, while it is receiving rays from outside the field of interest. By contrast, when one of the mirrors 20 has finished moving across the field of interest, another mirror may be positioned to begin the next elevation scan immediately. The use of the circular scan has been made possible by recognizing that such a scan could advantageously be placed in the image plane of the optical system. The reason that the circular scan can be used to advantage when employed in the image plane is that given briefly above in connection with the operation of FIG. 3. That is, since the path of mirrors 20 is a circle, and since the surface described by the focal points of the focusing system is a spherical one, the distance from the point at which a ray detected by detector 10 strikes the surface of mirror 20 and the location of the corresponding focal point for that ray on the spherical image surface is constant as mirror 20 rotates through its scan. This enables mirror 20 to perform its scan, while reflecting the radiation on detector 10 a constant ray path distance away. This results in improved resolution, as mentioned above.

It is apparent from the foregoing that various modifications of the invention are possible while still deriving the benefits provided thereby. For example, mirror 12 might be provided with six, rather than four reflecting sides. In like fashion, elevation scan mirrors 20 could be composed of six rather than four mirrors. The focusing system comprising corrector plates 15 and 18 and mirrors 16, 19 and 17 may be replaced by other suitable focusing elements, so far as the operation of the optical system as a whole is concerned. This is despite the fact that the focusing system described in connection with FIG. 3 operates particularly well, providing improved off-axis resolution in the image plane. Optical processing of the rays reflected from elevation scan mirrors 20 other than the processing provided by pyramidal mirror 21 may be employed, so long as the radiation remains focused on detector 10.

It is to be understood that the above-described embodiment is merely illustrative of the application of the principles of the invention. Numerous other arrangements may be devised by those skilled in the art without departing from the spirit and scope of the invention as defined by the appended claims.

What is claimed is:

1. An optical system comprising:
   first optical scanning means to perform a line scan producing a linear image of incident radiation,
   means to focus the rays from said first optical scanning means, and
   second optical scanning means to perform a circular scan producing a virtual circular image of the focused rays, thereby producing a combined image which exhibits the effects of a combined line and circular scan.

2. An optical system as set forth in claim 1, further including an infrared radiation detector responsive to said combined image.

3. An optical system as set forth in claim 1, wherein said means for performing a circular scan producing a circular image is a virtual mirror moving along a circular path which intercepts said focused rays.

4. An optical system as set forth in claim 3, wherein said means for performing a line scan producing a linear image includes a prism having plural reflecting sides and plural mirrors located to receive alternately the reflection of said incident radiation from individual reflecting sides of said prism when said prism is rotated.

5. A forward-looking infrared reconnaissance system comprising:
- means to redirect the infrared rays from a source in accordance with a scan along a first raster dimension,
- means to focus the rays redirected by said first-mentioned means,
- means to redirect the rays focused by said second-mentioned means in accordance with a circular scan producing a circular image along a virtual second raster dimension, and
- infrared radiation detector means responsive to the rays redirected by said third-mentioned means to produce an electrical output signal representative of said last-mentioned rays.

6. An optical system for an infrared scanner comprising:
- focusing means responsive to incident radiation to focus the radiation toward an image surface,
- mirror means moving between said focusing means and said image surface on a circular path to redirect the focused radiation to a point which is the same ray path length from said focusing means as is said image surface, and
- infrared radiation detector means at said point to respond to the focused radiation.

7. An optical system as set forth in claim 6, wherein said image surface is spherical and wherein the center of said circular path is on a radius of said spherical image surface.

8. An optical system, comprising:
(a) a prism in the shape of a rectangular solid with four identical reflecting surfaces,
(b) means to rotate said prism about the axis of symmetry of said four sides,
(c) two auxiliary mirrors, each arranged to receive alternately the reflection of the rays incident upon the system from one of the reflecting sides of the rotating prism,
(d) focusing means receiving the reflection from said auxiliary mirrors of the rays received by both of said mirrows to focus the rays reflected by said auxiliary mirrors.
(e) four mirrors lying on a circle whinch intercepts the rays focused by said focusing means,
(f) means to move said four mirrors along said circle in a circular scan producing a virtual circular image, and
(g) means to direct the rays reflected from said four mirrors to a point on the axis which is perpendicular to the plane including said circle and passing through the center of said circle.

9. An optical system as set forth in claim 8, further including an infrared radiation detector at said point responsive to the radiation redirected thereto.

References Cited
UNITED STATES PATENTS

| | | | |
|---|---|---|---|
| 2,997,539 | 8/1961 | Blackstone | 350—7 |
| 3,019,292 | 1/1962 | John | 350—7 |
| 3,120,577 | 2/1964 | Young | 350—7 |
| 3,206,603 | 9/1965 | Mauro | 350—294 |
| 3,211,046 | 10/1965 | Kennedy | 350—7 |
| 3,153,723 | 10/1964 | Weiss | 350—7 |

RODNEY D. BENNETT, Primary Examiner

W. T. RIFKIN, Assistant Exainmer

U.S. Cl. X.R.

178—7.6; 250—83.3; 350—7